(12) United States Patent
Wigren (10) Patent No.: US 9,439,201 B2
(45) Date of Patent: Sep. 6, 2016

(54) INTERFERENCE CANCELLATION

(75) Inventor: Torbjörn Wigren, Uppsala (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 257 days.

(21) Appl. No.: 14/350,173

(22) PCT Filed: Oct. 7, 2011

(86) PCT No.: PCT/SE2011/051203
§ 371 (c)(1),
(2), (4) Date: Apr. 7, 2014

(87) PCT Pub. No.: WO2013/051974
PCT Pub. Date: Apr. 11, 2013

(65) Prior Publication Data
US 2015/0208419 A1    Jul. 23, 2015

(51) Int. Cl.
*H04W 72/04* (2009.01)
*H04W 72/12* (2009.01)
*H04B 15/00* (2006.01)
(Continued)

(52) U.S. Cl.
CPC ......... *H04W 72/0486* (2013.01); *H04B 15/00* (2013.01); *H04J 13/00* (2013.01); *H04W 24/02* (2013.01); *H04W 72/0413* (2013.01); *H04W 72/1252* (2013.01)

(58) Field of Classification Search
CPC .............................. H04W 24/02; H04B 15/00
See application file for complete search history.

(56) References Cited

U.S. PATENT DOCUMENTS

2006/0194546 A1* 8/2006 Gunnarsson .......... H04W 28/18
                                                                         455/69
2007/0054619 A1    3/2007 Kinnunen et al.
2009/0088080 A1    4/2009 Zhang et al.
(Continued)

FOREIGN PATENT DOCUMENTS

EP     1 011 205 A2    6/2000
EP     1 689 131 A1    8/2006
(Continued)

OTHER PUBLICATIONS

International Search Report, Application No. PCT/SE2011/051203, Jun. 13, 2012.

(Continued)

*Primary Examiner* — Dang Ton
*Assistant Examiner* — Nourali Mansoury
(74) *Attorney, Agent, or Firm* — Myers Bigel & Sibley, P.A.

(57) ABSTRACT

A radio base station and a method therein for scheduling an uplink radio resource to a first user equipment in a wireless communication system which employs CDMA are provided. The method comprises measuring an Interference Cancellation, IC, gain for each user equipment in a set of user equipments currently being served by the radio base station. The method further comprises determining a user constellation pertaining to information regarding the different user equipments in the set of user equipments and their respective bitrates; and updating a table of IC gain with the measured IC gain in bins corresponding to the determined user constellation. The method further comprises predicting a load based on at least the updated table, and scheduling the uplink radio resource to the first user equipment at least partly based on the predicted load.

20 Claims, 4 Drawing Sheets (51) Int. Cl.
   *H04J 13/00*   (2011.01)
   *H04W 24/02*   (2009.01)

(56) References Cited

U.S. PATENT DOCUMENTS

| | | | |
|---|---|---|---|
| 2009/0264088 A1 | 10/2009 | Li et al. | |
| 2009/0280822 A1* | 11/2009 | Ericson | H04L 1/1877 455/452.2 |
| 2010/0135170 A1* | 6/2010 | Fan | H04W 28/16 370/252 |
| 2010/0317361 A1* | 12/2010 | Hu | H04W 52/50 455/450 |
| 2011/0044299 A1* | 2/2011 | Spencer | H04W 52/262 370/336 |

FOREIGN PATENT DOCUMENTS

| | | |
|---|---|---|
| EP | 1 689 131 B1 | 7/2008 |
| WO | WO 2007/103444 A1 | 9/2007 |
| WO | WO 2009/009461 A1 | 1/2009 |
| WO | WO 2009/072961 A2 | 6/2009 |
| WO | WO 2009/108088 A1 | 9/2009 |

OTHER PUBLICATIONS

Written Opinion of the International Searching Authority, Application No. PCT/SE2011/051203, Jun. 13, 2012.

McWilliams, "LS on the measurements required for EDCH Congestion Control", 3GPP TSG RAN WG1 Meeting #40, Scottsdale, AZ, USA, R1-050175, Feb. 14-18, 2005, 2 pp.

Wigren, "Recursive Noise Floor Estimation in WCDMA", *IEEE Transactions on Vehicular Technology*, vol. 59, No. 5, Jun. 2010, pp. 2615-2620.

Wigren, "Estimation of uplink WCDMA load in a single RBS", *IEEE 2007 Vehicular Technology Conference*, Sep. 30, 2007-Oct. 3, 2007, pp. 1499-1503.

Wigren, "Soft Uplink Load Estimation in WCDMA", *IEEE Transactions on Vehicular Technology*, vol. 58, No. 2, Feb. 2009, pp. 760-772.

* cited by examiner

| HARQ number | Number of users | User bit rates [kbit/s] | IC gain mean (fraction of air interface load factor) | IC gain variance |
|---|---|---|---|---|
| 1 | 3 | 960, 640, 640 | 0.25 | 0.01 |
|   | 2 | 960, 960 | 0.75 | 0.02 |
| ... | ... | ... |   |   |
| 2 | 2 | 1920, 1920 | 0.41 | 0.01 |
|   | 4 | 480, 480, 480, 480 | 0.20 | 0.005 |
| ... | ... | ... |   |   |
| 8 | 2 | 960, 960 | 0.55 | 0.012 |
| ... | ... | ... |   |   |
| 8 | 1 | 1920 | 0.01 | 0.0001 |

INTERFERENCE CANCELLATION

CROSS REFERENCE TO RELATED APPLICATION

This application is a 35 U.S.C. §371 national stage application of PCT International Application No. PCT/SE2011/051203, filed on 7 Oct. 2011, the disclosure and content of which is incorporated by reference herein in its entirety. The above-referenced PCT International Application was published in the English language as International Publication No. WO 2013/051974 A1 on 11 Apr. 2013.

TECHNICAL FIELD

Embodiments herein relate generally to interference cancellation and in particular to a radio base station and a method therein for measuring an interference cancellation gain, predicting an air interface load based on the interference cancellation gain and scheduling an uplink radio resource at least partly based on the predicted air interface load.

BACKGROUND

In WCDMA many users share the same frequency band. The transmission of one user thereby becomes interference for all other users in the uplink (and downlink). Interference is a problem for any receiver as it makes it difficult for the receiver to receive the sent out signal or transmission correctly. Often, errors are introduced in the received signal as a result of interference.

In order to overcome problems caused by interference, interference cancellation, IC, is used. When the transmission of a user equipment has been detected, or even decoded, the so obtained signal can be used to re-generate a model signal (a replica signal) that resembles the effect of the original transmitted signal of the user equipment, e.g. at the antenna or at another point in the receiver chain. The creation of the signal always requires that the channel model is available, to capture the effect of the radio transmission from the user equipment to the radio base station. The model signal can then be subtracted from the received broadband signal. In case the model signal is accurate, then the effect of the user on the uplink is significantly reduced. Since this signal is only interference for the other users, the effect of the subtraction is that interference as seen by the other users is cancelled, hence the acronym interference cancellation.

Interference cancellation is not a new technology in CDMA systems, and it exists in several variants. Interference cancellation can be based on demodulated IQ samples. Another option is to base the cancellation on decoded symbols. The latter option has the advantage of a better performance since the coding gain is exploited to enhance the quality of the model signal. On the other hand the delay is increased, due to the time needed for the decoding step. An additional delay is an inevitable consequence of most practical IC variants, since a model signal needs to be created before cancellation can be performed. Exceptions exist, however mostly at the price of an impractical computational complexity.

Another distinction of IC algorithms is between soft and hard algorithms—here the algorithms based on soft values are generally preferred, e.g. since today's turbo-codecs provide this information.

IC is computationally complex which creates problems when implementing IC in different architectures. There is a need to balance pure IC performance gains against the computational complexity and delay associated with different IC architectures.

The mobile broadband uplink also referred to as Enhanced Uplink, denoted EUL, operates by scheduling users to exploit the available load headroom in the best possible way. Since the headroom varies due to the load caused by already scheduled users, this scheduling needs to be fast. The scheduling is affected by delays of several scheduling intervals though (denoted transmission time intervals, TTIs), from the time a grant is scheduled and transmitted to a terminal, until the load appears on the uplink air interface as an interference power. This means that in order to be able to schedule so that the air interface load is kept below the maximum load needed to maintain stability and coverage of the cell, the scheduler needs to predict the load that appears over the air interface. In case without interference cancelling receivers, this prediction can e.g. be performed using measured Signal-to-Interference-Ratio, SIR, values, or alternatively powers, together with beta factors that define the offset of the data power of a user equipment, to the power controlled control channel. This load prediction is associated with errors, but is deemed sufficient for non-IC receivers.

The load prediction problems become formidable when IC receivers are introduced. The load appearing over the air interface is normally significantly reduced with IC receivers, as compared to non-IC receivers. The load reduction obtained by the IC receivers varies with the number of interfering user equipments in the cell, i.e. currently being served by a radio base station. Further, the load reduction obtained by IC receivers also varies with the bit rates of the interfering user equipments in the cell.

SUMMARY

It is an object of the exemplifying embodiments to address at least some of the problems outlined above. In particular, it is an object of the exemplifying embodiments to provide a radio base station and a method therein for scheduling an uplink radio resource to a first user equipment in a wireless communication system which employs Code Division Multiple Access, CDMA. These objects and others may be obtained by providing a radio base station and a method in a radio base station according to the independent claims attached below.

According to an aspect a method in a radio base station for scheduling an uplink radio resource to a first user equipment in a wireless communication system which employs CDMA is provided. The method comprises measuring an Interference Cancellation, IC, gain for each user equipment in a set of user equipments currently being served by the radio base station. The method further comprises determining a user constellation pertaining to information regarding the different user equipments in the set of user equipments and their respective bitrates; and updating a table of IC gain with the measured IC gain in bins corresponding to the determined user constellation. The method further comprises predicting a load based on at least the updated table, and scheduling the uplink radio resource to the first user equipment at least partly based on the predicted load.

According to an aspect, a radio base station adapted to schedule an uplink radio resource to a first user equipment in a wireless communication system which employs CDMA is provided. The radio base station comprises a measuring unit adapted to measure an Interference Cancellation, IC, gain for each user equipment in a set of user equipments currently being served by the radio base station. The radio base station further comprises a determining unit adapted to determine a user constellation pertaining to information regarding the different user equipments in the set of user equipments and their respective bitrates. Further, the radio base station comprises a managing unit adapted to update a table of IC gain with the measured IC gain in bins corresponding to the determined user constellation. The radio base station also comprises a prediction unit adapted to predict a load based on the updated table and a scheduler adapted to schedule the uplink radio resource to the first user equipment at least partly based on the predicted load.

The radio base station and the method therein have several advantages. One advantage is that the method enables load prediction for IC receivers like PIC, SIC, MUD and Turbo-IC, thereby making it possible to control the air interface load with high accuracy. Another advantage is that the exploitation of the uplink air interface becomes more efficient. A further advantage is that the measured RoTs occur simultaneously thereby optimising accuracy

BRIEF DESCRIPTION OF DRAWINGS

Embodiments will now be described in more detail in relation to the accompanying drawings, in which.

DETAILED DESCRIPTION

Briefly described, a radio base station and a method therein for scheduling an uplink radio resource to a first user equipment in a wireless communication system which employs Code Division Multiple Access, CDMA are provided.

Firstly, different IC architectures will be described, the architectures being Successive Interference Cancellation, SIC, Parallel Interference Cancellation, PIC, and Multi-User Detection, MUD.

In the SIC architecture, a detected signal of a first user equipment is immediately used to improve the conditions for all other user equipments, then the detected signal of user equipment 2 is used to improve the conditions for all user equipments but the first, and so on. This means that IC gains are achieved already at stage 1, however the delay of each stage will be dependent on the detection time of each user equipment, the delay may hence depend on the number of (IC) users.

In the PIC architecture, interference subtraction is only performed between stages. The consequence is that the number of units for regeneration and subtraction become large. The delay is however fixed, a fact that simplifies system design.

MUD is a technology when a joint optimization problem is formulated for interference cancellation of all (or a set of) users simultaneously. Such a problem can e.g. be formulated as a maximum likelihood (ML) problem. The solution becomes very computationally intense, and MUD is usually considered as too complex to implement.

Another option is to include also a channel estimation step in the MUD. That would of course make the algorithm even more computationally intense. It is mentioned here since approximate versions may be considered, e.g. integrating channel estimation in PIC and SIC schemes.

Without IC, the load at an antenna connector is given by the noise rise, or rise over thermal, RoT(t). The RoT is defined by:

$$RoT(t) = \frac{P_{RTWP}(t)}{P_N(t)} \quad (1)$$

$P_N(t)$ is the thermal noise level as measured at the antenna connector. $P_{RTWP}(t)$ is defined as the total wideband power which is unaffected of any despreading function applied in the radio base station. $P_{RTWP}(t)$ is defined by:

$$P_{RTWP}(t) = \sum_{k=1}^{K} P_k(t) + P_{neighbour}(t) + P_N(t) \quad (2)$$

In equation (2), $P_{neighbour}(t)$ denotes the power as received from neighbour cells of the CDMA or WCDMA communication system. There is a major difficulty of the RoT estimation, due to the need to separate the thermal noise power from the interference from neighbour cells. Another specific issue that needs to be addressed is that the signal reference points are, by definition at the antenna connectors. The measurements are however obtained after the analogue signal conditioning chain, in the digital receiver. The analogue signal conditioning chain does introduce a scale factor error of about 1 dB (1-sigma) that is difficult to compensate for. However, all powers of (2) are equally affected by the scale factor error so when (1) is calculated, the scale factor error is cancelled as:

$$RoT^{DigitalReceiver}(t) = \frac{P_{RTWP}^{DigitalReceiver}(t)}{P_N^{DigitalReceiver}} = \frac{\gamma(t)P_{RTWP}^{Antenna}(t)}{\gamma(t)P_N^{Antenna}(t)} = RoT^{Antenna}(t) \quad (3)$$

In addition;

$$P_{neighbour}(t)+P_N(t)=E[P_{neighbour}(t)]+E[P_N(t)]+\Delta P_{neighbour}(t)+\Delta P_N(t) \quad (4)$$

In equation (4), E[ ] denotes a mathematical expectation and Δ denotes the variation around the mean. A fundamental problem can now be seen. Since there are no measurements available in the radio base station that are related to the neighbour cell interference, a linear filtering operation can at best estimate the sum $E[P_{neighbour}(t)]+E[P_N(t)]$. This estimate cannot be used to deduce the value of $E[P_N(t)]$. The situation is the same as when the sum of two numbers is available. Then there is no way to figure out the values of the individual numbers. The noise power floor is not mathematically observable and must thus be estimated. One example of estimating the noise power floor is to use a sliding window algorithm. By measuring the noise over a relatively long time window, a soft minimum noise value will occur with a high likelihood. This soft minimum will be considered to be the noise power floor. This estimation relies on the fact that the noise power floor is constant over very long periods of time, disregarding any small temperature drift.

An exemplifying embodiment of a method in a radio base station will now be described with reference to FIG. 1 which is a flowchart of an exemplifying embodiment of a method in a radio base station for scheduling an uplink radio resource to a first user equipment in a wireless communication system.

Figure 1:
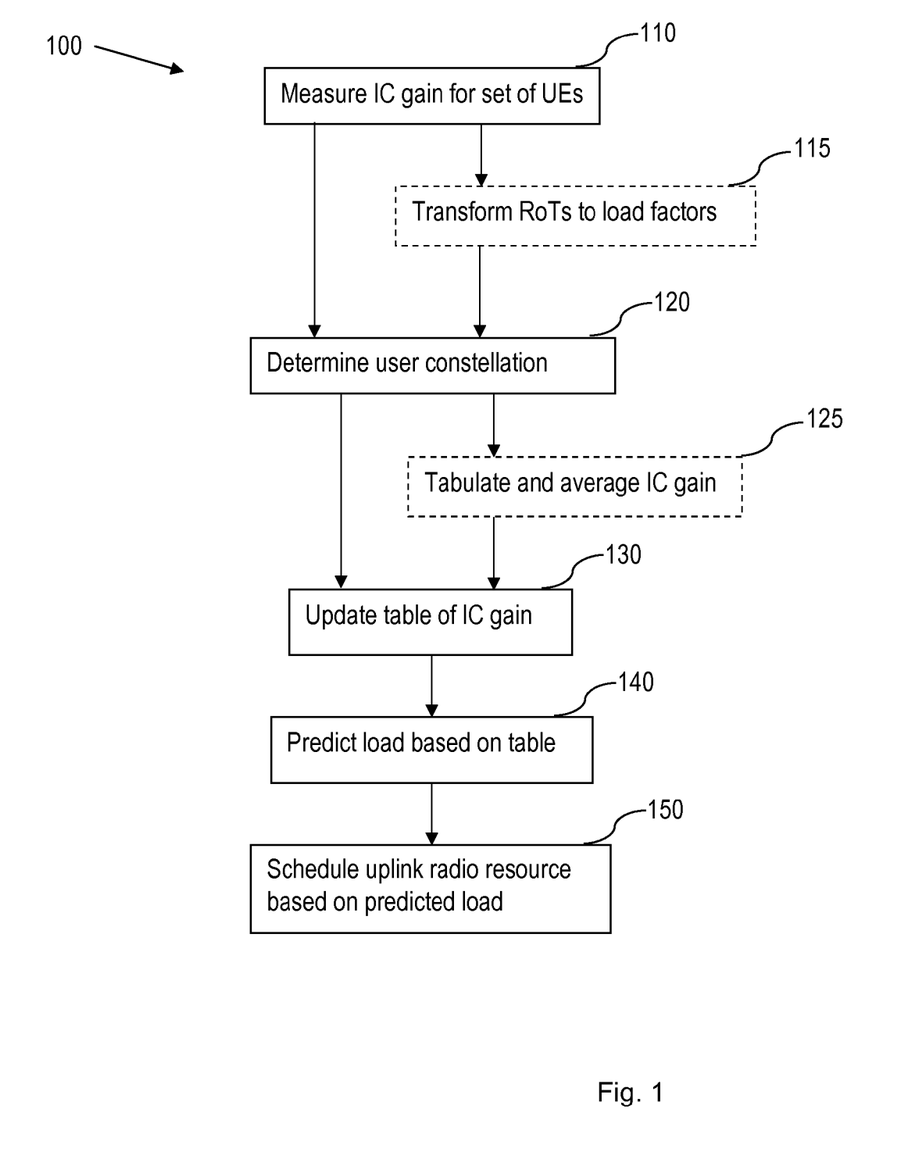
FIG. 1 is a flowchart of an exemplifying embodiment of a method in a radio base station for scheduling an uplink radio resource to a first user equipment in a wireless communication system.

FIG. 1 illustrates the method in a radio base station for scheduling an uplink radio resource to a first user equipment in a wireless communication system which employs CDMA comprising measuring 110 an Interference Cancellation, IC, gain for each user equipment in a set of user equipments currently being served by the radio base station. The method further comprises determining 120 a user constellation pertaining to information regarding the different user equipments in the set of user equipments and their respective bitrates; and updating 130 a table of IC gain with the measured IC gain in bins corresponding to the determined user constellation. The method further comprises predicting 140 a load based on at least the updated table, and scheduling 150 the uplink radio resource to the first user equipment at least partly based on the predicted load.

The radio base station measures an IC gain for each user equipment in a set of user equipments currently being served by the radio base station. This means that the radio base station defines a set of user equipments out of all user equipments currently being served by the radio base station. The set of user equipments may comprise all of the user equipments currently being served by the radio base station or only a part of all the user equipments currently being served by the radio base station.

The radio base station also determines a user constellation pertaining to information regarding the different user equipments in the set of user equipments and their respective bitrates. Typically, a radio base station serves a variety of different user equipments simultaneously. The different user equipments may transmit in uplink using different bitrates. For example, some user equipments transmit at 640 kbit/s and some user equipments transmit at 960 kbit/s. Still some user equipments transmit at 1920 kbit/s. The user constellation comprises information pertaining to the number of user equipments in the set of user equipments for which the IC gain is measured by the radio base station. Further, the user constellation comprises information pertaining to the different bitrates used by the user equipments in the set of user equipments. Just as an example, a user constellation for a set of user equipments for which the IC gain is measured may comprise one user equipment transmitting at 640 kbit/s, three user equipments transmitting at 960 kbit/s and two user equipments transmitting at 480 kbit/s.

Once the radio base station has measured the IC gain for the set of user equipments and determined the user constellation, the method comprises updating an IC gain table. The IC gain table is updated with respect to the measured IC gain in bins corresponding to the determined user constellation. By updating the IC-gain table, the IC gain table becomes "self-learning", meaning that for a specific user constellation, the IC gain for that specific user constellation will thereafter be available to the radio base station.

When the radio base station is to schedule an uplink radio resource to the user equipment in the set of user equipments, the method comprises the radio base station predicting a load based on the updated table. The load is the load on the air interface in uplink. Depending on the load, the user equipment may be allotted or scheduled more or less radio resources in the uplink. The more the load, the more the interference generally. By predicting the load on the air interface, the radio base station then schedules the uplink radio resource to the first user equipment at least partly based on the predicted load.

The embodiment of the method described above has several advantages. One advantage is that the method enables load prediction for IC receivers like PIC, SIC, MUD and Turbo-IC, thereby making it possible to control the air interface load with high accuracy. Another advantage is that the exploitation of the uplink air interface becomes more efficient. A further advantage is that the measured RoTs occur simultaneously thereby optimising accuracy.

According to an embodiment, measuring 110 the IC gain for the set of user equipments comprises measuring an air interface load as seen after IC processing and an air interface load before IC processing.

In order to establish the IC gain, the air interface load as seen before IC processing and the air interface load as seen after IC processing are measured. By comparing the air interface load before and after IC processing, the IC gain is determined.

According to still an embodiment, the air interface load is measured as rise over thermal, RoT.

RoT provides a measure of the air interface load as seen by the radio base station. The air interface load is dependent upon the so called noise power floor, interference from neighbouring radio base stations and user equipments being served by the neighbouring radio base stations. The air interface load is further dependent on the transmissions from the user equipments currently being served by the radio base station.

The IC gain $\Delta RoT^{IC}$ is then determined as a difference between the air interface load before and the load after IC processing:

$$\Delta RoT^{IC} = RoT(t) - RoT^{IC}(t) \qquad (5)$$

In equation (5), RoT(t) is the load on the air interface before IC processing and $RoT^{IC}(t)$ is the load on the air interface as seen after IC processing, i.e. the air interface load reduced with IC processing gains. The gain in the RoT is then normally a positive quantity, i.e. the RoT decreases as seen after IC processing.

The RoT after IC processing is individual for each user equipment. This can be seen by consideration of a simple example. In this example one user equipment is transmitting at high data rate while another user equipment is transmitting at low data rate. Due to the spreading factor difference, the power and the Signal-to-Noise-Ratio, SNR, of the high data rate information may be significantly higher than for the low data rate user equipment. Due to this fact, the channel estimate of the high data rate user equipment is good and after successful modulation a very accurate model signal could be constructed. When subtracted from the incoming signal, the interference of the low data rate user equipment would be significantly reduced. The total interference experienced by the low data rate user equipment would then be quite low, meaning that the RoT after IC would be quite low for the low data rate user equipment. The latter follows from the fact that $$RoT^{IC}_{LDR} = \frac{P^{IC}_{RTWP,LDR}(t)}{P_N(t)} \qquad (6)$$

$$RoT_{HDR}^{IC} = \frac{P_{RTWP,HDR}^{IC}(t)}{P_N(t)} \quad (7)$$

In equations (6) and (7), $RoT_{LDR}^{IC}$ is the load (expressed as the RoT) experienced by the low data rate, LDR, user equipment after IC processing and similarly for $RoT_{HDR}^{IC}$ is the load experienced by the high data rate, HDR, user equipment after IC processing. The thermal noise levels are the same since no filtering gain affects the main signal path. Further, $P_{RTWP,LDR}^{IC}(t)$ denotes the total wideband interference experienced by the low data rate user equipment after IC processing, i.e. after cancellation of the high data rate user equipment. $P_{RTWP,HDR}^{IC}(t)$ denotes the total wideband interference experienced by the high data rate user equipment after IC processing, i.e. after cancellation of the low data rate user equipment. In case the interference cancellations are successful, then the lowest IC gain is experienced by the high data rate user equipment. This user is then the dominating user equipment in the uplink. Thus it can be seen then that the uplink load is user equipment dependent after IC processing and also that the noise power floor remains unaffected after IC processing.

In other words, the user equipment that is the one being closest to violating the load limit is the one with the highest RoT, which in terms of RoT is related to the radio coverage. Hence, a suitable IC load measure is $$RoT^{IC}(t) = \max_{users}(RoT_{user}^{IC}(t)) = \max_{users}\left(\frac{P_{RTWP,user}^{IC}(t)}{P_N(t)}\right) \quad (8)$$

In equation (8), $RoT^{IC}(t)$ denotes the uplink RoT after IC processing, $RoT_{user}^{IC}(t)$ is the rise over thermal experienced by a user equipment, and $P_{RTWP,user}^{IC}(t)$ is the wideband total interference experienced by the user equipment after IC processing.

Again, with reference to FIG. 1, according to yet an embodiment, the method further comprises transforming 115 the RoT after IC processing and the RoT before IC processing to load factors.

By transformation of the RoT after IC processing and the RoT before IC processing to load factors, the need for neighbour cell estimation is eliminated. A load equation is defined as:

$$L_{own}(t) = 1 - \frac{P_{neighbour}(t)/P_N(t) + 1}{RoT(t \mid kT)} \quad (9)$$

In equation (9), k is an integer and T is the transmission time interval. The RoT(t) is affected by IC in a user equipment dependent way. $P_N(t)$ is unaffected by IC as has been described above. When employing IC processing, the IC processing can only subtract re-generated interference from the own cell. In other words, as a replica signal or a model signal is generated, it is subtracted from the incoming signal, which incoming signal is the sum of all transmissions from user equipments currently being served by the radio base station, the noise power floor and interference from neighbouring radio base station. As a consequence, $P_{neighbour}(t)$ is unaffected by IC. Therefore, $$L_{own}^{IC}(t) = 1 - \frac{P_{neighbour}(t)/P_N(t) + 1}{RoT^{IC}(t + kT)} \quad (10)$$

According to an embodiment, the method further comprises determining the IC gain by determining a load factor difference between the air interface load before and after IC processing.

Normally, the RoT varies non-linearly close to the pole capacity. Denoting the load factor as seen before IC processing by $L_{own}(t)$ and the load factor as seen after IC processing by $L_{own}^{IC}(t)$, the IC gain $\Delta L_{own}^{IC}(t)$ can be expressed as:

$$\Delta L_{own}^{IC}(t) = L_{own}(t) - L_{own}^{IC}(t). \quad (11)$$

The IC gain in the load factor domain is then normally a positive quantity, i.e. the load factor decreases as seen after IC processing. Using equations (9) and (10), the IC gain $\Delta L_{own}^{IC}(t)$ can be expressed as:

$$\Delta L_{own}^{IC}(t) = 1 - \frac{P_{neighbour}(t)/P_N(t) + 1}{RoT(t + kT)} - 1 + \frac{P_{neighbour}(t)/P_N(t) + 1}{RoT^{IC}(t + kT)} = \left(\frac{P_{neighbour}(t)}{P_{N(t)}} + 1\right)\left(\frac{1}{RoT^{IC}(t \mid kT)} - \frac{1}{RoT(t \mid kT)}\right) \quad (12)$$

The neighbouring cell interference can be estimated, for example by using a Kalman filter so that an internally estimated state $x_1(t)$ becomes a model of the sum on the actual neighbouring cell interference and the thermal noise power floor. As having been explained above, the thermal noise power floor $P_N(t)$ can be estimated even though not mathematically exactly computable. Then the neighbouring cell interference $P_{neighbour}(t)$ is determined by subtracting the thermal noise power floor from the internally estimated interference. As stated above, neighbour cell interference estimation is independent of IC processing so that the estimation can be performed before or after IC processing.

One example of how to estimate the neighbouring cell interference is to measure $P_{RTWP}(t)$ with a sampling rate of $T_{RTWP}=k_{RTWP}TTI$, where $k_{RTPW}$ is a positive integer and TTI is Transmission Time Interval. TTI is for example 2 or 10 ms. The load factors $L_{own}(t)$ are computed with a sampling rate of $T_L=k_L TTI$, where $k_L$ is a positive integer.

The state $x_1(t)$ is then selected as:

$$x_1(t) = P_{neighbour}(t) + P_N(t) \quad (13)$$

The measured signal which is available for processing is $P_{RTWP}(t)$. The load of the own cell $L_{own}(t)$ is a computed quantity based e.g. Signal-to Interference-and-Noise-Ratio, SINR. A measurement model of $P_{RTWP}(t)$ is then needed, expressed in terms of states, computed quantities and a measurement uncertainty. The measurement model is defined as:

$$P_{RTWP}(t) = L_{own}(t-T_D)P_{RTPW}(t) + P_{neighbour}(t) + P_N(t) \quad (14)$$

In equation (14), $T_D$ is a delay that models the scheduling loop delay of WCDMA. Equation (14) results in $$P_{RTWP}(t) = (1 - L_{own}(t-T_D))(P_{neighbour}(t) + P_N(t)) \quad (15)$$

After addition of a zero mean white measurement noise $e_{RTWP}(t)$ and replacement of variables by the state (13), the following time variable measurement equation results:

$$\gamma_{RTWP}(t) = \frac{x_1(t)}{1 - L_{own}(t - T_D)} + e_{RTPW}(t) \quad (16)$$

$$R_{2,RTWP}(t) = E|e_{RTWP}^2(t)| \quad (17)$$

In equations (16) and (17), $\gamma_{RTWP}(t)=P_{RTWP}(t)$ and $R_{2,RTWP}(t)$ denotes the covariance matrix of $e_{RTPW}(t)$. The load of the own cell is determined using both Enhanced Uplink, EUL, and Release 99 traffic, hence in this case the delay is valid for both. By release 99 traffic is meant traffic which is defined in 3GPP Technical Specification which specifies the first Universal Mobile Telecommunications System, UMTS, third generation, 3G, networks, incorporating a CDMA air interface. By setting up a dynamic state model and a state model behind the Kalman filter, the neighbour cell interference plus the noise power floor estimation may be obtained, the details are well known to anyone skilled in the art.

In case functionality for measurement of the neighbour cell interference is unavailable, the quotient $$P_{neighbour}(t) / P_N(t)$$

is in one example configured or set to 0. In this example, the accuracy will be somewhat adversely affected.

According to still an embodiment, determining 120 a user constellation comprises measuring Transport Format Combination Indicator, TFCI, and Enhanced-TFCI, E-TFCI used by user equipments in the set of user equipments.

In WCDMA, the uplink Dedicated Physical Data Channel, DPDCH, is used to carry dedicated data generated at layer 2 and higher, i.e. the dedicated transport channel (DCH). There may be zero, one, or a plurality of uplink DPDCHs on each layer 1 connection. The uplink Dedicated Physical Control Channel, DPCCH, is used to carry control information generated at layer 1. Control information consists of known pilot bits to support channel estimation for coherent detection, transmit power-control commands, feedback information and an optional TFCI. The TFCI informs the receiver about the instantaneous parameters of the different transport channels multiplexed on the uplink DPDCH, and corresponds to the data transmitted in the same frame. For each layer 1 connection, there is only one uplink DPCCH.

According to yet an embodiment, the method further comprises tabulating and averaging 125 the IC gain as a function of at least a subset of the user constellation.

In order to maintain and update the table of IC gain, the measured or determined IC gain is tabulated and averaged as a function of at least a subset of the user constellation. The table is in one example built such that the user equipment status of the uplink that affects the IC gains the most can be used to indicate a corresponding IC gain, expressed in the load factor domain. In other words, different user equipments in a set of user equipments will affect the uplink to different extents. Some user equipments will cause more interference in the uplink than others and some user equipments will cause substantially the same level of interference. The table of IC gains is built such that the user equipment which causes the highest level of interference in uplink can be used to indicate a corresponding gain.

In a first example, the table entries are created as a function of a subset of the number of uplink user equipments. In case the number of uplink users is high, the table will become very large. To reduce the size of the table, the number of uplink user equipments is divided into a number of high data rate users, above an uplink granted bit rate threshold and a number of remaining background low data rate user equipments, below the uplink granted bit rate threshold.

In a second example, the table entries are created as a function of a subset of granted bit rates of the user equipments. In case the IC gain table is very large, the granted bit rates of the user equipments are divided into the granted bit rates of the high data rate users, above the uplink granted bit rate threshold and the total granted bit rate of background low data rate user equipments, below the uplink granted bit rate threshold.

In a further example, spreading factor information or any other numbering scheme is used to replace the granted bit rate information.

The averaging of $\langle \Delta RoT_{IC} \rangle$ or $\langle \Delta L_{own}^{IC} \rangle$ is in one example performed in the RoT domain and in another example in the load factor domain. In addition, variances are estimated in one example ($\langle (\Delta RoT^{IC})^2 \rangle^2$ or $\langle (\Delta L_{own}^{IC})^2 \rangle$). Below, four exemplifying recursive equations are given to be used for this purpose.

$$\langle \Delta RoT^{IC} \rangle (t+T) = \alpha_1 \langle \Delta RoT^{IC} \rangle (t) + (1-\alpha_1)\Delta RoT^{IC}(t) \quad (18)$$

$$\langle (\Delta RoT^{IC})^2 \rangle (t+T) = \alpha_2 \langle (\Delta RoT^{IC})^2 \rangle (t) + (1-\alpha_2)$$
$$(\Delta RoT^{IC}(t) - \langle \Delta RoT^{IC} \rangle (t))^2 \quad (19)$$

$$\langle \Delta L_{own}^{IC} \rangle (t+T) = \alpha_3 \langle \Delta L_{own}^{IC} \rangle (t) + (1-\alpha_3)\Delta L_{own}^{IC}(t) \quad (20)$$

$$\langle (\Delta L_{own}^{IC})^2 \rangle (t+T) = \alpha_4 \langle (\Delta L_{own}^{IC})^2 \rangle (t) + (1-\alpha_4)$$
$$(\Delta L_{own}^{IC}(t) - \langle \Delta L_{own}^{IC} \rangle (t))^2 \quad (21)$$

In equations (18)-(21) above, $\langle \rangle$ indicates average. According to an embodiment, the IC gain is expressed as a fraction of the total load at the air interface or after IC processing. This embodiment is illustrated in FIG. 3.

Figure 3:
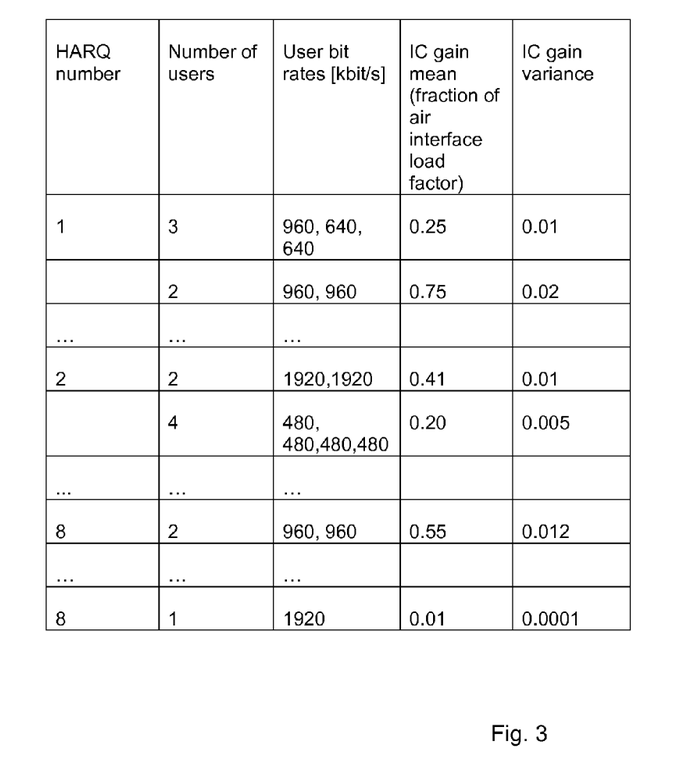
FIG. 3 is an example of an IC gain table.

FIG. 3 is an example of an IC gain table assuming the load factor adaptation is used. The IC gain table is self-learning as it is continuously updated.

A normalization requires that the following averages are determined in case of normalisation with regard to the air interface RoT:

$$\langle RoT \rangle (t+T) = \alpha_1 \langle RoT \rangle (t) + (1-\alpha_1)RoT(t) \quad (22)$$

$$\langle (RoT)^2 \rangle (t+T) = \alpha_2 \langle (RoT)^2 \rangle (t) + (1-\alpha_2)(RoT(t) - \langle RoT \rangle (t))^2 \quad (23)$$

$$\langle L_{own} \rangle (t+T) = \alpha_3 \langle L_{own} \rangle (t) + (1-\alpha_3)L_{own}(t) \quad (24)$$

$$\langle (L_{own})^2 \rangle (t+T) = \alpha_4 \langle (L_{own})^2 \rangle (t) + (1-\alpha_4)(L_{own}(t) - \langle L_{own} \rangle (t))^2 \quad (25)$$

In case of normalisation with the load after IC gains, the following is used in an example:

$$\langle RoT^{IS} \rangle (t+T) = \alpha_1 \langle RoT^{IC} \rangle (t) + (1-\alpha_1)RoT^{IC}(t) \quad (26)$$

$$\langle (RoT^{IC})^2 \rangle (t+T) = \alpha_2 \langle (RoT^{IC})^2 \rangle (t) + (1-\alpha_2)(RoT^{IC}(t) - \langle RoT^{IC} \rangle (t))^2 \quad (27)$$

$$\langle L_{own}^{IC} \rangle (t+T) = \alpha_3 \langle L_{own}^{IC} \rangle (t) + (1-\alpha_3)L_{own}^{IC}(t) \quad (28)$$

$$\langle (L_{own}^{IC})^2 \rangle (t+T) = \alpha_4 \langle (L_{own}^{IC})^2 \rangle (t) + (1-\alpha_4)(L_{own}^{IC}(t) - \langle L_{own}^{IC} \rangle (t))^2 \quad (29)$$

In equations (22)-(29) above, the different $\alpha$'s represent different filter constants.

According to an embodiment of the method, the scheduling 150 of the uplink radio resource to the first user equipment comprises scheduling radio resources in WCDMA, Enhanced Uplink, EUL.

Enhanced Uplink, EUL, is specified in 3GPP Release 6 and has been extended with additional transport and control channels, such as the enhanced dedicated channel (E-DCH), and with similar features to High-Speed Uplink Packet Access. EUL is designed to support the needs of mobile broadband with increased performance in the uplink.

According to still an embodiment, the scheduling 150 the uplink radio resource to the first user equipment comprises scheduling radio resources in Time Division Multiplexing, TDM uplink.

In the 3GPP release 99, the Radio Network Controller, RNC, controls resources and user mobility. Resource control in this framework means admission control, congestion control, channel switching (roughly changing the data rate of a connection). Furthermore, a dedicated connection is carried over a dedicated channel DCH, which is realized as a DPCCH (Dedicated Physical Control Channel) and a DPDCH (Dedicated Physical Data Channel).

In the evolved 3G standards, decision making is becoming decentralised, and in particular the control over the short term data rate of the user connection. The uplink data is then allocated to Enhanced Dedicated Channel, E-DCH, which is realized as the triplet: a DPCCH, which is continuous, an E-DPCCH for data control and an E-DPDCH for data. The two latter are only transmitted when there is uplink data to send. Hence the Node B uplink scheduler determines which transport formats each user can use over E-DPDCH. The RNC is however still responsible for admission control.

Figure 4:
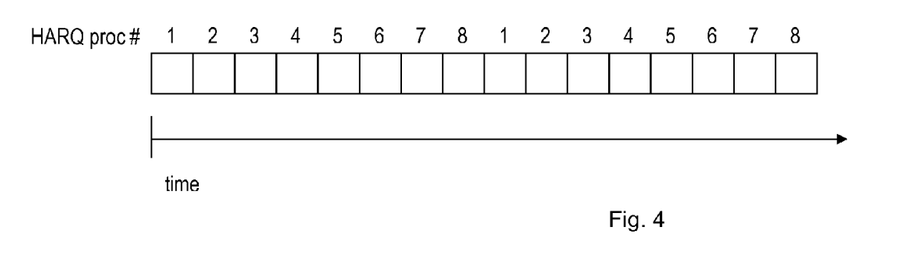
FIG. 4 is a block diagram illustrating 8 parallel HARQ processes.

A data block is sent by the user equipment to the radio base station or NodeB during a transmission time interval (TTI). For efficiency reasons, the received data blocks at the receiver are processed in parallel at M parallel processors taking turn to process data. While data block i is processed and decoding information is fed back to the transmitter, the receiver starts processing data blocks i, i+1, . . . . By the time when the receiver processor 1 has decoded the data block and fed back the decoding result, it is ready for processing either a retransmission of information related to the recently processed data or a new data block. By combining information both from the original data block and the retransmission, it is possible to correct errors in the reception. A retransmission scheme with both error correction and error detection is referred to hybrid ARQ. Therefore, the M processes are often referred to as HARQ processes, each handling a data block received in a TTI. FIG. 4 depicts parallel HARQ processes for M=8.

In the WCDMA uplink, there is a trade-off between coverage and enabled peak rates. This is even more emphasized with enhanced uplink, which supports higher bit rates than ordinary dedicated channels. The uplink resources are limited by the RoT that the cell can tolerate. The RoT limit is either motivated by coverage requirements or power control stability requirements. When only one user is connected in the cell, both power control stability and coverage are minor issues, since the uplink interference is likely to be dominated by the power generated by this user.

Figure 5:
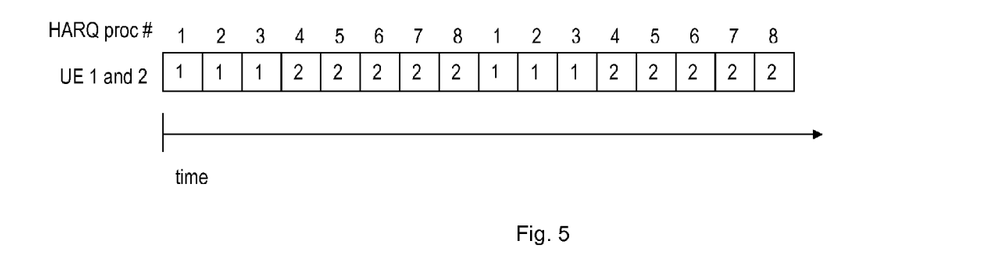
FIG. 5 is a block diagram illustrating 8 parallel HARQ processes with two UEs being assigned the HARQ processes.

In order to orthogonalize the uplink user equipment transmissions to a greater extend, one example is to separate the user data transmissions in time, and employ a TDM scheme. In an example, grants which are only valid for specified HARQ processes are allocated to a user equipment. In this manner, TDM for EUL is enabled. Furthermore, employing TDM in this manner allows retransmissions without interfering with other user equipments, since retransmissions hit the same HARQ process as the original transmission. FIG. 5 provides some example resource allocations in a TDM setting. In FIG. 5, two user equipments 1 and 2 are allocated the available HARQ processes. FIG. 5 further depicts 8 parallel HARQ processes.

In an example, the IC gain is measured and/or determined per HARQ process. This means that the measurement of RoT before and after IC gains needs to be done per HARQ process. Neighbour cell interference and noise power floor may or may not be performed per HARQ since these are not directly dependent on the scheduling. One IC gain table is enough, providing division between HARQ processes. However, in one example, equations (18)-(21) are performed per HARQ process.

In order to make use of the built-up information on IC gains in the table of IC gain, the procedure is, in an example, to calculate the load factors of the user equipments currently being served by the radio base station, as seen before IC processing, i.e. as if there would not be any IC receiver. Then look up the HARQ process, current number of users and their bitrates. Find the closest, or even the exact, entry in the IC gain table. Adjust the determined load factor of the uplink with the tabulated mean of the IC gain and possibly adjust further, in response to the tabulated variance. Then schedule user equipments using load factors adjusted with IC gains.

Embodiments herein also relate to a radio base station adapted to schedule an uplink radio resource to a first user equipment in a wireless communication system which employs Code Division Multiple Access, CDMA.

Such a radio base station will now be described with reference to FIG. 2. The radio base station has the same objects and advantages as the method performed therein and will only be described in brief in order to avoid unnecessary repetition.

Figure 2:
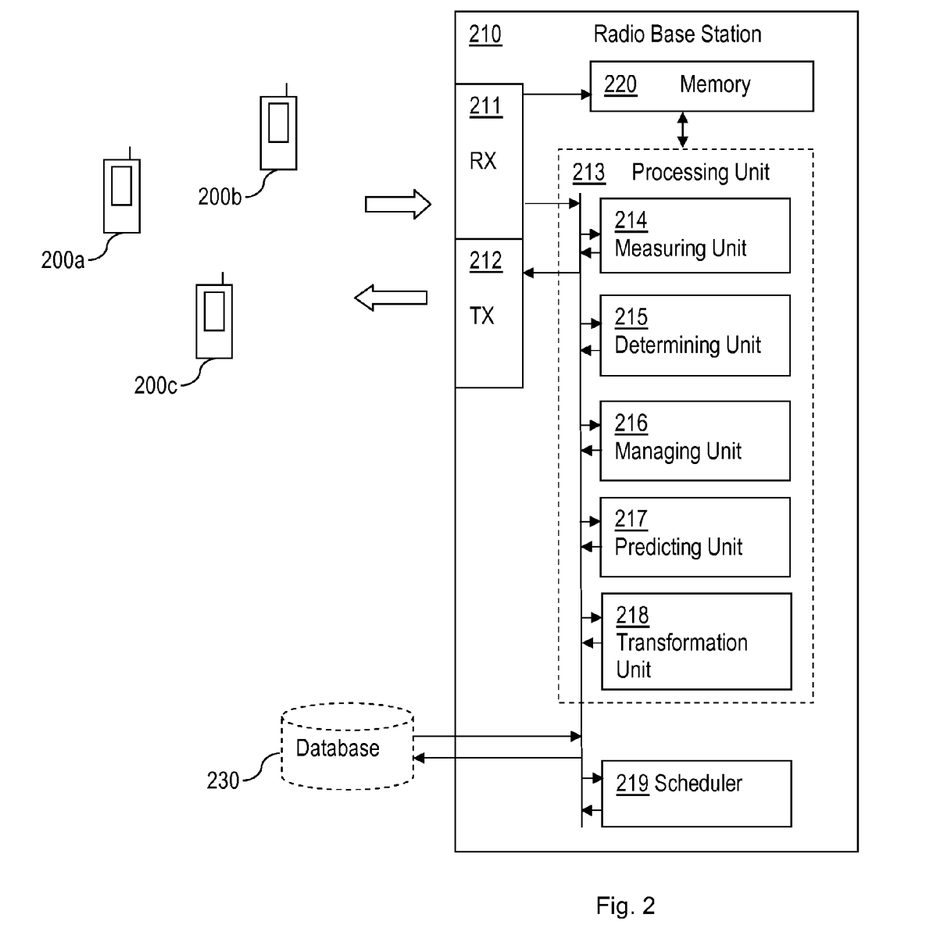
FIG. 2 is a block diagram of an exemplifying embodiment of a radio base station adapted to schedule an uplink radio resource to a first user equipment in a wireless communication system.

FIG. 2 is a block diagram of an exemplifying embodiment of a radio base station adapted to schedule an uplink radio resource to a first user equipment in a wireless communication system.

FIG. 2 illustrates the exemplifying embodiment of a radio base station 210 adapted to schedule an uplink radio resource to a first user equipment 200a in a wireless communication system, which employs CDMA, comprising a measuring unit 214 adapted to measure an Interference Cancellation, IC, gain for each user equipment 200a, 200b and 200c in a set of user equipments currently being served by the radio base station 210. The radio base station 210 further comprises a determining unit 215 adapted to determine a user constellation pertaining to information regarding the different user equipments in the set of user equipments and their respective bitrates. Further, the radio base station 210 comprises a managing unit 216 adapted to update a table of IC gain with the measured IC gain in bins corresponding to the determined user constellation. The radio base station 210 also comprises a prediction unit 217 adapted to predict a load based on the updated table and a scheduler 219 adapted to schedule the uplink radio resource to the first user equipment at least partly based on the predicted load.

FIG. 2 illustrates the radio base station comprising a receiver arrangement 211 and a transmitter arrangement 212, by means of which the radio base station 210 communicates with user equipments 200a-200c currently being served by the radio base station. FIG. 2 further illustrates the radio base station comprising a processing unit 213 comprising dedicated units 214-218 for performing the above mentioned measuring, determining, managing and predicting features. The processing unit 213 is in an example implemented e.g. by one or more of: a processor or a micro processor and adequate software stored in a memory, a Programmable Logic Device (PLD) or other electronic component(s) or processing circuit(s) configured to perform the actions mentioned above FIG. 2 also illustrates the radio base station comprising a scheduler 219 adapted to schedule uplink radio resources to the user equipments 200a-200c currently being served by the radio base station 210. Further, FIG. 2 illustrates the radio base station 210 comprising a memory 220, which in one example comprises the IC gain table. In an alternative example, the radio base station is connected to a database 230 comprising the IC gain table The database may for example be a standalone node, an Operation, Administration and Maintenance node or a core network node.

According to an embodiment, the measuring unit 214 is adapted to measure the IC gain for the set of user equipments by measuring an air interface load as seen after IC processing and an air interface load before IC processing.

According to still an embodiment, the air interface load is measured as rise over thermal, RoT.

According to yet an embodiment, the radio base station 210 further comprises a transformation unit 218 adapted to transform the RoT after IC processing and the RoT before IC processing to load factors.

In still an embodiment, the determination unit 215 is further adapted to determine the IC gain by determining a load factor difference between the air interface load before and after IC processing.

In an embodiment, the measuring unit 214 is adapted to measure Transport Format Combination Indicator, TFCI, and Enhanced-TFCI, E-TFCI used by user equipments in the set of user equipments and wherein the determination unit 215 is further adapted to determine a user constellation based on the measured TFCI, and Enhanced-TFCI, E-TFCI used by user equipments in the set of user equipments.

According to an embodiment, the managing unit 216 further is adapted to tabulate and average the IC gain as a function of at least a subset of the user constellation.

According to yet an embodiment, the scheduler 219 is adapted to schedule the uplink radio resource to the first user equipment by scheduling radio resources in Wideband Code Division Multiple Access, WCDMA, Enhanced Uplink, EUL.

According to still an embodiment, the scheduler 219 is adapted to schedule the uplink radio resource to the first user equipment by scheduling radio resources in Time Division Multiplexing, TDM uplink.

It should be noted that FIG. 2 merely illustrates various functional units in the radio base station in a logical sense. The functions in practice may be implemented using any suitable software and hardware means/circuits etc. Thus, the embodiments are generally not limited to the shown structures of the radio base station and the functional units. Hence, the previously described exemplary embodiments may be realised in many ways. For example, one embodiment includes a computer-readable medium having instructions stored thereon that are executable by the processing unit for executing the method. The instructions executable by the computing system and stored on the computer-readable medium perform the method steps of the present invention as set forth in the claims.

FIG. 2 schematically shows an embodiment of a radio base station 210 in a network node. Comprised in the radio base station 210 are here a processing unit 213, e.g. with a DSP (Digital Signal Processor). The processing unit 213 may be a single unit or a plurality of units to perform different actions of procedures described herein. The radio base station 210 may also comprise an input unit for receiving signals from other entities, and an output unit for providing signal(s) to other entities. The input unit and the output unit may be arranged as an integrated entity.

Furthermore, the radio base station 210 comprises at least one computer program product in the form of a non-volatile memory, e.g. an EEPROM (Electrically Erasable Programmable Read-Only Memory), a flash memory and a hard drive. The computer program product comprises a computer program, which comprises code means, which when executed in the processing unit 213 in the radio base station 210 causes the radio base station to perform the actions e.g. of the procedure described earlier in conjunction with FIG. 1.

The computer program may be configured as a computer program code structured in computer program modules. Hence, in an exemplifying embodiment, the code means in the computer program of the radio base station 210 comprises a measuring module for measuring an Interference Cancellation, IC, gain for each user equipment in a set of user equipments currently being served by the radio base station. The computer program further comprises a determining module for determining a user constellation pertaining to information regarding the different user equipments in said set of user equipments and their respective bitrates. The computer program further comprises a managing module for updating a table of IC gain with the measured IC gain in bins corresponding to the determined user constellation. Still further, the computer program could further comprise a prediction module for predicting a load based on the updated table. The computer program could further comprise other modules for providing other desired functionality.

The modules could essentially perform the actions of the flow illustrated in FIG. 1, to emulate the radio base station 210. In other words, when the different modules are executed in the processing unit 213, they may correspond to the units 214-218 of FIG. 2.

Although the code means in the embodiment disclosed above in conjunction with FIG. 2 are implemented as computer program modules which when executed in the processing unit causes the radio base station 210 to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the radio base station.

It is to be understood that the choice of interacting units or modules, as well as the naming of the units within this disclosure are only for exemplifying purpose, and nodes suitable to execute any of the methods described above may be configured in a plurality of alternative ways in order to be able to execute the suggested procedure actions.

It should also be noted that the units or modules described in this disclosure are to be regarded as logical entities and not with necessity as separate physical entities While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method in a radio base station for scheduling an uplink radio resource to a first user equipment in a wireless communication system which employs Code Division Multiple Access (CDMA) the method, performed by the radio base station, comprising:
    receiving, at a receiving circuit of the radio base station, a plurality of signals from a set of user equipments currently being served by the radio base station in the wireless communication system,
    measuring an Interference Cancellation (IC) gain for each user equipment in the set of user equipments currently being served by the radio base station, wherein the IC comprises canceling an interference within the plurality of signals received at the receiving circuit of the base station by processing respective ones of the plurality of received signals based on a measurement by the radio base station of at least one of the plurality of signals received at the receiving circuit of the radio base station,
    determining a user constellation pertaining to information regarding different user equipments in said set of user equipments and their respective bitrates,
    selecting a bin of a plurality of bins in an IC gain table responsive to the determined user constellation, wherein the plurality of bins correspond to different user constellations,
    updating the IC gain table with the measured IC gain in the selected bin,
    predicting a load based on said updated IC gain table, and
    scheduling the uplink radio resource to the first user equipment at least partly based on said predicted load.

2. The method according to claim 1, wherein measuring the IC gain for the set of user equipments comprises measuring an air interface load as seen after IC processing and an air interface load before IC processing.

3. The method according to claim 2, wherein of the air interface load is measured as rise over thermal (RoT).

4. The method of claim 3, wherein the IC gain is the difference between the air interface load before the IC processing and the air interface load as seen after the IC processing.

5. The method according to claim 3, further comprising transforming said RoT after the IC processing and said RoT before the IC processing to load factors.

6. The method according to claim 5, wherein said IC gain is determined by determining a load factor difference between the air interface load before and after the IC processing.

7. The method according to claim 1, wherein determining the user constellation comprises measuring Transport Format Combination Indicator (TFCI) and Enhanced-TFCI (E-TFCI) used by user equipments in the set of user equipments.

8. The method according to claim 1, further comprising tabulating and averaging the IC gain as a function of at least a subset of the user constellation.

9. The method according to claim 1, wherein said scheduling the uplink radio resource to the first user equipment comprises scheduling radio resources in Wideband Code Division Multiple Access (WCDMA) Enhanced Uplink (EUL).

10. The method according to claim 1, wherein said scheduling the uplink radio resource to the first user equipment comprises scheduling radio resources in Time Division Multiplexing (TDM) uplink.

11. A radio base station configured to schedule an uplink radio resource to a first user equipment in a wireless communication system which employs Code Division Multiple Access (CDMA) the radio base station comprising:
    a receiving circuit configured to receive a plurality of signals from a set of user equipments currently being served by the radio base station in the wireless communication system,
    at least one processor; and
    memory coupled to the at least one processor and comprising computer readable program code embodied in the memory that when executed by the at least one processor configures the processor to:
    measure an Interference Cancellation (IC) gain for each user equipment in the set of user equipments currently being served by the radio base station, wherein the IC comprises canceling an interference within the plurality of signals received at the receiving circuit of the base station by processing respective ones of the plurality of received signals based on a measurement by the radio base station of at least one of the plurality of signals received at the receiving circuit of the radio base station,
    determine a user constellation pertaining to information regarding different user equipments in said set of user equipments and their respective bitrates,
    select a bin of a plurality of bins in an IC gain table responsive to the determined user constellation, wherein the plurality of bins correspond to different user constellations,
    update the IC gain table with the measured IC gain in the selected bin,
    predict a load based on said updated IC gain table, and
    schedule the uplink radio resource to the first user equipment at least partly based on said predicted load.

12. The radio base station according to claim 11, wherein the at least one processor is configured to measure the IC gain for the set of user equipments by measuring an air interface load as seen after IC processing and an air interface load before IC processing.

13. The radio base station according to claim 12, wherein the air interface load is measured as rise over thermal (RoT).

14. The radio base station according to claim 13, wherein the IC gain is the difference between the air interface load before IC processing and the air interface load as seen after IC processing.

15. The radio base station according to claim 13, wherein the at least one processor is further configured to transform said RoT after the IC processing and said RoT before the IC processing to load factors.

16. The radio base station according to claim 15, wherein the adapted at least one processor is further configured to determine said IC gain by determining a load factor difference between the air interface load before and after the IC processing.

17. The radio base station according to claim 11, wherein the at least one processor is configured to measure Transport Format Combination Indicator (TFCI) and Enhanced-TFCI (E-TFCI) used by user equipments in the set of user equipments and wherein the processor is further configured to determine a user constellation based on the measured TFCI and E-TFCI used by user equipments in the set of user equipments.

18. The radio base station according to claim 11, wherein the at least one processor is further configured to tabulate and average the IC gain as a function of at least a subset of the user constellation.

19. The radio base station according to claim 11, wherein the at least one processor is configured to schedule the uplink radio resource to the first user equipment by scheduling radio resources in Wideband Code Division Multiple Access (WCDMA) Enhanced Uplink (EUL).

20. The radio base station according to claim 11, wherein the at least one processor is configured to schedule the uplink radio resource to the first user equipment by scheduling radio resources in Time Division Multiplexing (TDM) uplink.

\* \* \* \* \*

UNITED STATES PATENT AND TRADEMARK OFFICE
CERTIFICATE OF CORRECTION

PATENT NO. : 9,439,201 B2
APPLICATION NO. : 14/350173
DATED : September 6, 2016
INVENTOR(S) : Wigren It is certified that error appears in the above-identified patent and that said Letters Patent is hereby corrected as shown below:

On the Title Page

In item (56), under "U.S. PATENT DOCUMENTS", in Column 2, Line 1, delete "Gunnarsson" and insert -- Gunnarsson et al. --, therefor.

On Page 2, in item (56), under "U.S. PATENT DOCUMENTS", in Column 1, Line 2, delete "Ericson" and insert -- Ericson et al. --, therefor.

On Page 2, in item (56), under "U.S. PATENT DOCUMENTS", in Column 1, Line 4, delete "Fan" and insert -- Fan et al. --, therefor.

On Page 2, in item (56), under "U.S. PATENT DOCUMENTS", in Column 1, Line 6, delete "Hu" and insert -- Hu et al. --, therefor.

On Page 2, in item (56), under "U.S. PATENT DOCUMENTS", in Column 1, Line 8, delete "Spencer" and insert -- Spencer et al. --, therefor.

In the Specification

In Column 3, Line 46, delete "CDMA" and insert -- CDMA, --, therefor.

In Column 6, Line 62, delete "that" and insert -- that: --, therefor.

In Column 7, Lines 1-4, delete " $RoT_{HDR}^{IC} = \dfrac{P_{RTWP,HDR}^{IC}(t)}{P_N(t)}$ " and Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,439,201 B2 insert -- $$RoT_{HDR}^{IC} = \frac{P_{RTWP,HDR}^{IC}(t)}{P_N(t)}$$ --, therefor.

In Column 7, Line 29, delete "is" and insert -- is: --, therefor.

In Column 7, Lines 52-54, delete " $L_{own}(t) = 1 - \frac{P_{neighbour}(t)/P_N(t) + 1}{RoT(t|kT)}$ " and insert -- $L_{own}(t) = 1 - \frac{P_{neighbour}(t)/P_N(t) + 1}{RoT(t+kT)}$ --, therefor.

In Column 8, Lines 26-29, delete " $\left(\frac{P_{neighbour}(t)}{P_{N(t)}} + 1\right)\left(\frac{1}{RoT^{IC}(t|kT)} - \frac{1}{RoT(t|kT)}\right)$ ," and insert -- $\left(\frac{P_{neighbour}(t)}{P_{N(t)}} + 1\right)\left(\frac{1}{RoT(t+kT)} - \frac{1}{RoT(t+kT)}\right)$ --, therefor.

In Column 8, Line 62, delete "in" and insert -- in: --, therefor.

In the Claims

In Column 15, Line 50, in Claim 3, delete "wherein of the" and insert -- wherein the --, therefor.

In Column 16, Line 16, in Claim 11, delete "station" and insert -- station, --, therefor.

In Column 16, Line 64, in Claim 16, delete "the adapted at" and insert -- the at --, therefor.